(12) United States Patent
Onogi

(10) Patent No.: US 11,949,836 B2
(45) Date of Patent: Apr. 2, 2024

(54) IMAGE TRANSMISSION DEVICE HAVING A FUNCTION OF TRANSMITTING IMAGE DATA BY AN E-MAIL

(71) Applicant: SHARP KABUSHIKI KAISHA, Sakai (JP)

(72) Inventor: Kenji Onogi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/579,399

(22) Filed: Jan. 19, 2022

(65) Prior Publication Data
US 2022/0247872 A1 Aug. 4, 2022

(30) Foreign Application Priority Data
Feb. 1, 2021 (JP) ................................. 2021-014460

(51) Int. Cl.
*H04N 1/00* (2006.01)
*H04N 1/32* (2006.01)

(52) U.S. Cl.
CPC ..... *H04N 1/32117* (2013.01); *H04N 1/00212* (2013.01)

(58) Field of Classification Search
CPC . H04N 1/0014; H04N 1/32117–32149; H04N 1/00212; H04N 1/00222; H04N 1/00225
See application file for complete search history.

(56) References Cited

U.S. PATENT DOCUMENTS

| | | | | |
|---|---|---|---|---|
| 10,911,492 | B2* | 2/2021 | Mulder | G06F 21/6236 |
| 2006/0253536 | A1 | 11/2006 | Fujiwara et al. | |
| 2009/0109482 | A1* | 4/2009 | Sato | H04L 51/212 |
| | | | | 358/1.15 |
| 2009/0195819 | A1* | 8/2009 | Sugimoto | H04N 1/00413 |
| | | | | 358/1.15 |
| 2009/0323115 | A1* | 12/2009 | Van Bergen | G06Q 10/107 |
| | | | | 358/1.15 |
| 2013/0222836 | A1* | 8/2013 | Kakegawa | G06F 21/55 |
| | | | | 358/1.14 |

(Continued)

FOREIGN PATENT DOCUMENTS

| | | | | |
|---|---|---|---|---|
| JP | 2004-304292 A | | 10/2004 | |
| JP | 2007274254 A | * | 10/2007 | ............. H04L 69/28 |
| JP | 2013-223169 A | | 10/2013 | |

*Primary Examiner* — Barbara D Reinier
(74) *Attorney, Agent, or Firm* — ScienBiziP, P.C.

(57) ABSTRACT

An image transmission device includes a communicator that transmits image data to an e-mail address set by a user via a network, an operation acceptor that accepts user's settings, a storage that stores, for each predetermined case, a target domain applicable to the case, and a controller that controls the communicator, the operation acceptor, and the storage. When the user sets an e-mail address to which image data are to be transmitted, the controller determines whether a domain portion of the e-mail address matches a target domain of the case, and when the domain portion matches the target domain, the controller accepts settings of the e-mail address, and when the domain portion of the e-mail address does not match the target domain of the case, the controller does not accept settings of the e-mail address.

5 Claims, 18 Drawing Sheets

(56) References Cited

U.S. PATENT DOCUMENTS

| | | | |
|---|---|---|---|
| 2013/0308167 A1* | 11/2013 | Nishiyama | H04N 1/00209 358/402 |
| 2015/0215481 A1* | 7/2015 | Faust | H04N 1/32122 358/1.13 |
| 2017/0034367 A1* | 2/2017 | Oomori | H04N 1/32069 |
| 2020/0128141 A1* | 4/2020 | Sugawara | H04N 1/4433 |

* cited by examiner

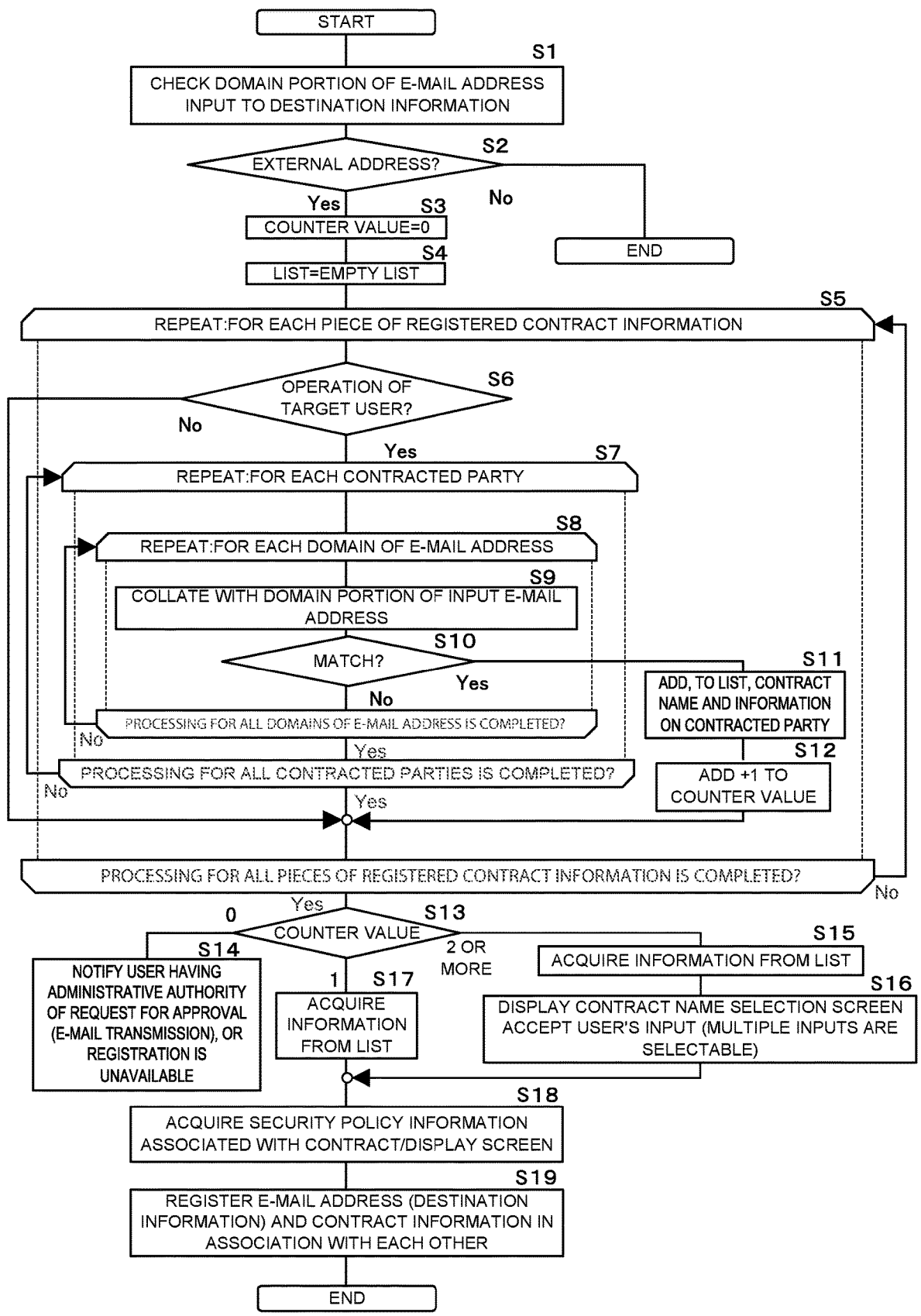

SECURITY POLICY SETTINGS

| | |
|---|---|
| CONTRACT NAME: | CONFIDENTIALITY AGREEMENT ON X1 |
| EXPIRATION DATE: | 2021/03/06 |
| TARGET USER: | DISPLAY |
| CONTRACTED PARTY NAME 1: | ABCDE CORPORATION |
| DOMAIN: | *@abcde.co.jp; *@123-abcde.co.jp |
| JOB SETTINGS: | DISPLAY |

RETURN  ENTER

SECURITY POLICY SETTINGS

| | |
|---|---|
| DOMAIN: | *@abcde.co.jp |
| ORGANIZATION NAME: | ABCDE CORPORATION |
| CONTRACT NAME 1: | CONFIDENTIALITY AGREEMENT ON X1 |
| EXPIRATION DATE: | 2021/03/06 |
| TARGET USER: | DISPLAY |
| JOB SETTINGS: | DISPLAY |

RETURN  ENTER

FIG. 7

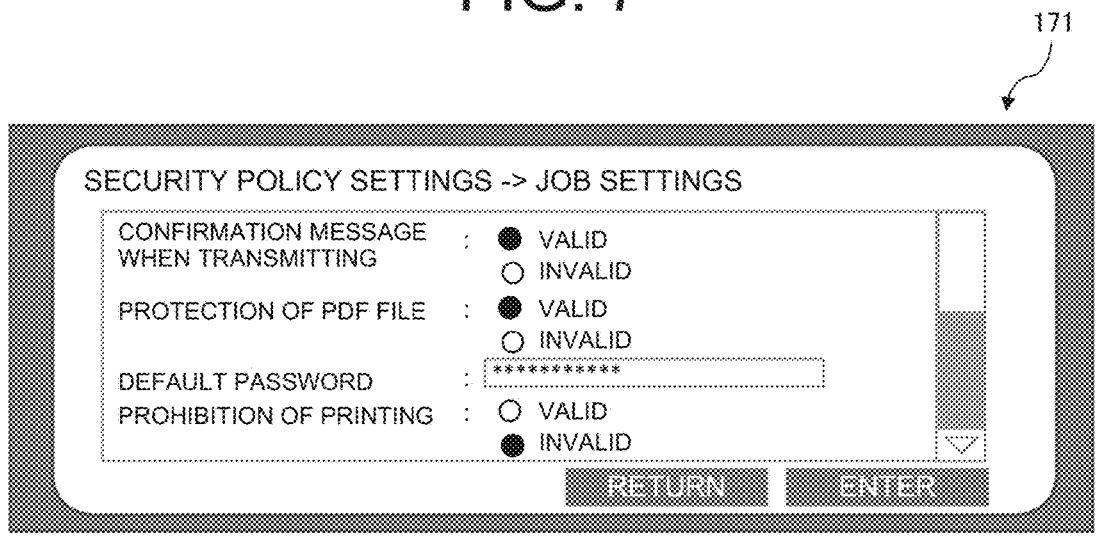

FIG. 8

| | |
|---|---|
| CONFIRMATION MESSAGE WHEN TRANSMITTING | VALID/INVALID |
| PROTECTION OF PDF FILE | VALID/INVALID |
| | DEFAULT PASSWORD |
| | PROHIBITION OF PRINTING    VALID/INVALID |
| | DOCUMENT INVALIDATION AFTER EXPIRY OF CONTRACT    VALID/INVALID |
| ADDITION OF WATERMARK | VALID/INVALID |
| | DETAIL SETTINGS (SUCH AS WORDING, COLOR, AND DENSITY) |
| RECORDING OF TRANSMISSION HISTORY | VALID/INVALID |

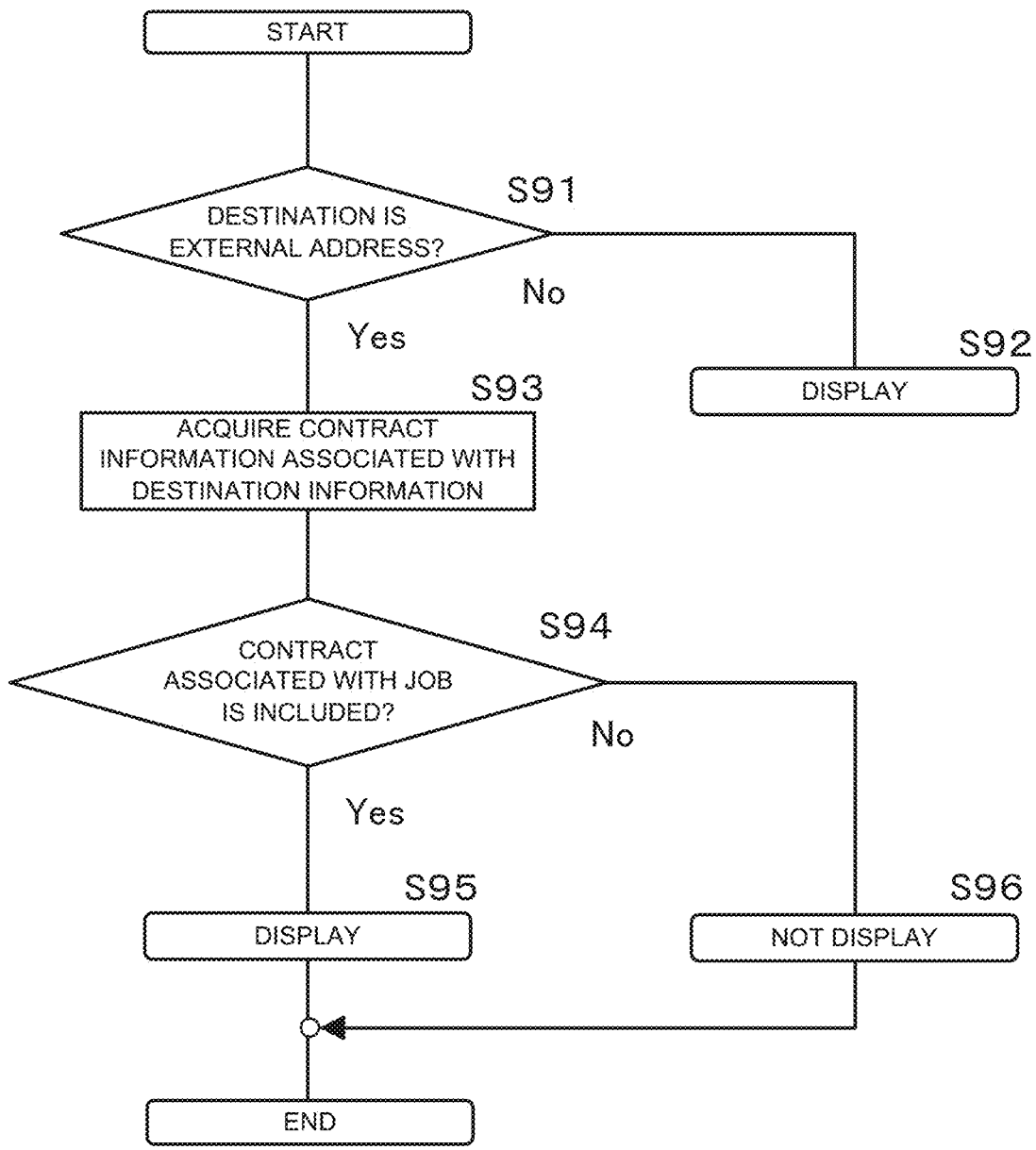

FIG. 20

THE FOLLOWING IS HISTORY ON TRANSMISSION JOBS YOU HAVE PERFORMED IN RELATION TO CONTRACT NAME 'CONFIDENTIALITY AGREEMENT ON X1'.
TO NARROW DOWN LIST, CLICK ITEM IN HEADING LINE.

| DESTINATION | TRANSMISSION DATE AND TIME | SUBJECT NAME | NAME OF TRANSMISSION FILE | MAIL BODY | IMAGE CONFIRMATION |
|---|---|---|---|---|---|
| MR. XX | 2020/3/3 14:05 | (NO SETTING) | MX211-20200303140521.pdf | DISPLAY | DISPLAY |
| MR. XX | 2020/3/20 9:21 | (NO SETTING) | MX211-20200320092143.pdf | DISPLAY | DISPLAY |
| MR. XX, MR. YY | 2020/5/15 16:40 | CONCERNING SENDING QUOTATION | MX211-20200515164005.pdf | DISPLAY | DISPLAY |
| MR. XX | 2020/7/7 10:05 | (NO SETTING) | MX211-20200707100507.pdf | DISPLAY | DISPLAY |

FIG. 21

EXPIRATION DATE OF CONTRACT NAME 'CONFIDENTIALITY AGREEMENT ON X1' IS 2020/12/31.
THE FOLLOWING IS HISTORY ON TRANSMISSION JOBS YOU HAVE PERFORMED IN RELATION TO THIS CONTRACT.
TO NARROW DOWN LIST, CLICK ITEM IN HEADING LINE.

| DESTINATION | TRANSMISSION DATE AND TIME | SUBJECT NAME | NAME OF TRANSMISSION FILE | MAIL BODY | IMAGE CONFIRMATION |
|---|---|---|---|---|---|
| MR. XX | 2020/3/3 14:05 | (NO SETTING) | MX211-20200303140521.pdf | DISPLAY | DISPLAY |
| MR. XX | 2020/3/20 9:21 | (NO SETTING) | MX211-20200320092143.pdf | DISPLAY | DISPLAY |
| MR. XX, MR. YY | 2020/5/15 16:40 | CONCERNING SENDING QUOTATION | MX211-20200515164005.pdf | DISPLAY | DISPLAY |
| MR. XX | 2020/7/7 10:05 | (NO SETTING) | MX211-20200707100507.pdf | DISPLAY | DISPLAY |

FIG. 22

EXPIRATION DATE OF CONTRACT NAME 'CONFIDENTIALITY AGREEMENT ON X1' HAS BEEN EXTENDED UNTIL 2021/12/31.
AMONG TRANSMISSION JOBS YOU HAVE PERFORMED IN RELATION TO THIS CONTRACT, YOU CAN RE-CREATE AND TRANSMIT PDF FILE WITH EXPIRATION DATE RESET FOR THE FOLLOWING ONES. SELECT DESIRED ONES.

| SELECT | DESTINATION | TRANSMISSION DATE AND TIME | SUBJECT NAME | NAME OF TRANSMISSION FILE | MAIL BODY | IMAGE CONFIRMATION |
|---|---|---|---|---|---|---|
| ☐ | MR. XX | 2020/3/3 14:05 | (NO SETTING) | MX211-20200303140521.pdf | DISPLAY | DISPLAY |
| ☐ | MR. XX | 2020/7/7 10:05 | (NO SETTING) | MX211-20200707100507.pdf | DISPLAY | DISPLAY |

EXECUTE DETAIL SETTINGS

IMAGE TRANSMISSION DEVICE HAVING A FUNCTION OF TRANSMITTING IMAGE DATA BY AN E-MAIL

BACKGROUND OF THE INVENTION

Field of the Invention

The present invention relates to an image transmission device, and more particularly, to an image transmission device having a function of transmitting image data by an e-mail.

Description of the Background Art

Conventionally, it is known that an image forming apparatus such as a multifunction peripheral (MFP) has an image transmission function that transmits scanned image data to a set destination by an e-mail.

In such an image transmission device, there is a problem that image data may be inadvertently transmitted to an incorrect transmission destination, when a user who is not familiar with an operation inputs an e-mail address as a transmission destination by mistake.

To solve such a problem, an invention has been disclosed in which only transmittable domain names are registered in advance, and transmission is permitted only for e-mail addresses including the transmittable domain names (see, for example, Japanese Unexamined Patent Application Publication No. 2004-304292).

Also, disclosed is an invention directed to an image transmission device including a domain registration unit that registers a transmittable domain name of an e-mail address, and a restriction unit that restricts transmission of image data to an e-mail address as a transmission destination, when a domain name of an e-mail address input as the transmission destination is not registered in the domain registration unit, wherein settings on transmission restriction by the restriction unit, and editing of an address list registered in the address registration unit are permitted only to an administrator having an administrative authority (see, for example, Japanese Unexamined Patent Application Publication No. 2013-223169).

For example, in a case where scanned image data are transmitted to a party with whom a contract including a confidentiality clause has been concluded, a user can make predetermined default settings in conformity with a contract content or an arrangement for each domain name of an e-mail address by using conventional settings. However, it is cumbersome to manually input the same settings for each of a plurality of domain names, when there are a plurality of contracted parties under the same contract.

In addition, when a plurality of contracts are concluded with a same party, a situation may arise in which it is desired to attach a different expiration date and a password to electronic data to be transmitted depending on which contract the electronic data are associated with. However, since domain names of e-mail addresses are identical, it is difficult to deal with such a situation by a method in which default settings are made based on a domain name.

In addition, since business partners subject to confidentiality differ depending on which contract each user is involved in, it is difficult for an administrator to recognize all these contracts, and administer transmission settings for each user, and there is a risk that information may be accidentally leaked to the outside in a manner that is not considered to be subject to confidentiality.

The present invention has been made in view of the circumstances as described above, and provides an image transmission device capable of transmitting image data more appropriately than before to a party to whom confidentiality should be maintained, without making settings for individual destinations in an e-mail.

SUMMARY OF THE INVENTION (1) An image transmission device according to the present invention includes: a communicator that transmits image data to an e-mail address set by a user via a network; an operation acceptor that accepts settings by the user; a storage that stores, for each predetermined case, a target domain applicable to the case; and a controller that controls the communicator, the operation acceptor, and the storage. When the user sets an e-mail address to which image data are to be transmitted, the controller determines whether a domain portion of the e-mail address matches a target domain of the case, and when the domain portion matches the target domain, the controller accepts settings of the e-mail address, and when the domain portion of the e-mail address does not match the target domain of the case, the controller does not accept settings of the e-mail address.

In the present invention, the "image transmission device" is, for example, a device that transmits image data by an e-mail. Also, the "predetermined case" includes various transactions, projects, and the like, in addition to a contract as a form of agreement having legal support. Also, the "target domain applicable to each predetermined case" is, for example, a domain of a mail address of a business partner with whom a confidentiality agreement has been concluded, when the case is the confidentiality agreement.

According to the present invention, it is determined whether the domain portion matches a target domain applicable to a contract for each predetermined contract, and settings of the e-mail address are accepted, only when the domain portion matches the target domain. Therefore, it is possible to achieve an image transmission device capable of transmitting image data more appropriately than before to a party to whom confidentiality should be maintained, without making settings for individual destinations in an e-mail.

Furthermore, preferred aspects according to the present invention are described.

(2) The image transmission device may further include a user authenticator that authenticates a user. The storage may store a target user applicable to the case for each predetermined case, and the transmittable target domain for the each target user. When the user sets an e-mail address to which image data are to be transmitted, the controller may determine whether a user authenticated by the user authenticator is the target user of the case, when the user is the target user, the controller may determine whether a domain portion of the e-mail address matches a target domain transmittable for the target user, and when the domain portion matches the target domain, the controller may accept settings of the e-mail address. When the user is not a target user, or when a domain portion of the email address does not match a target domain transmittable for the target user, the controller may not accept settings of the e-mail address.

Thus, settings of the e-mail address are accepted, only when a user authenticated by the user authenticator is a target user of a predetermined case, and when a domain portion of an e-mail address matches a target domain transmittable for the target user. Therefore, it is possible to achieve an image transmission device capable of transmitting image data more appropriately than before to a party to whom confidentiality should be maintained, without making settings for individual destinations in an e-mail.

(3) The image transmission device may further include a transmission setter that sets transmission settings for the image data. The storage may store transmission settings that are defined in advance for each target domain of the case. When a domain portion of the e-mail address matches a target domain of the case, the controller may cause the transmission setter to make transmission settings for the image data, based on transmission settings defined based on the target domain.

Thus, since transmission settings that are defined in advance based on a case related to a transmission destination are made for image data to be transmitted, it is possible to achieve an image transmission device capable of transmitting image data more appropriately than before to a party to whom confidentiality should be maintained, without making settings for individual destinations in an e-mail.

(4) The transmission settings may include at least one of addition of a watermark to image data, protection by a password, and an expiration date.

Thus, predetermined transmission settings such as addition of a watermark, protection by a password, and an expiration date are made for image data to be transmitted based on a case related to a transmission destination. Therefore, it is possible to achieve an image transmission device capable of transmitting image data more appropriately than before to a party to whom confidentiality should be maintained, without making settings for individual destinations in an e-mail.

(5) The image transmission device may further include a displayer that displays various pieces of information to a user. When causing the transmission setter to make transmission settings for the image data, based on transmission settings defined based on the target domain, the controller may cause the displayer to display a content of the transmission settings.

Thus, in an image transmission device capable of transmitting image data more appropriately than before to a party to whom confidentiality should be maintained, without making settings for individual destinations in an e-mail, when predetermined transmission settings are made for image data to be transmitted based on a case related to a transmission destination, a content of the transmission settings is displayed on a displayer. Therefore, it is possible to achieve a highly convenient image transmission device for a user than before.

(6) The image transmission device may further include a displayer that displays various pieces of information to a user. The storage may store a transmission history on image data, and an expiration date of the case. The controller may cause the displayer to display the expiration date of the case, and a list of the transmission history on the image data pertaining to the case, at a predetermined timing.

Thus, since an expiration date of a case related to a transmission destination, and a list of a transmission history on the image data pertaining to the case are displayed on a displayer at a predetermined timing, it is possible to achieve a highly convenient image transmission device for a user than before.

BRIEF DESCRIPTION OF THE DRAWINGS

FIG. 4 is a flowchart illustrating an example of destination registration processing for an address book of the digital multifunction machine in FIG. 1.

FIG. 5 is an example of a security policy setting screen displayed on a displayer of the digital multifunction machine in FIG. 1.

FIG. 6 is an example of a domain-based security policy setting screen displayed on the displayer of the digital multifunction machine in FIG. 1.

FIG. 7 is an example of a job setting screen displayed on the displayer of the digital multifunction machine in FIG. 1.

FIG. 8 is an example of job settings of the digital multifunction machine in FIG. 1.

FIG. 19 is a flowchart illustrating an example of display/non-display determination processing of each destination on a destination selection screen of the digital multifunction machine according to Embodiment 4 of the present invention in a case where a destination of an external address is included in an already set destination.

FIG. 20 is an explanatory diagram illustrating an example of a confirmation screen of a transmission history on jobs of a digital multifunction machine according to Embodiment 5 of the present invention.

FIG. 21 is an explanatory diagram illustrating an example of a confirmation screen of a transmission history on jobs, when a contract expiration date of the digital multifunction machine according to Embodiment 5 of the present invention has come.

FIG. 22 is an explanatory diagram illustrating an example of a confirmation screen of a transmission history on jobs, when the contract expiration date of the digital multifunction machine according to Embodiment 5 of the present invention is extended.

DESCRIPTION OF THE PREFERRED EMBODIMENTS

In the following, the present invention is described in further detail with reference to the drawings. The following description is illustrative in all respects, and should not be construed to limit the present invention.

Embodiment 1

A digital multifunction machine 1, which is an embodiment of an image transmission device according to the present invention, is described with reference to FIGS. 1 to 3.

Figure 1:
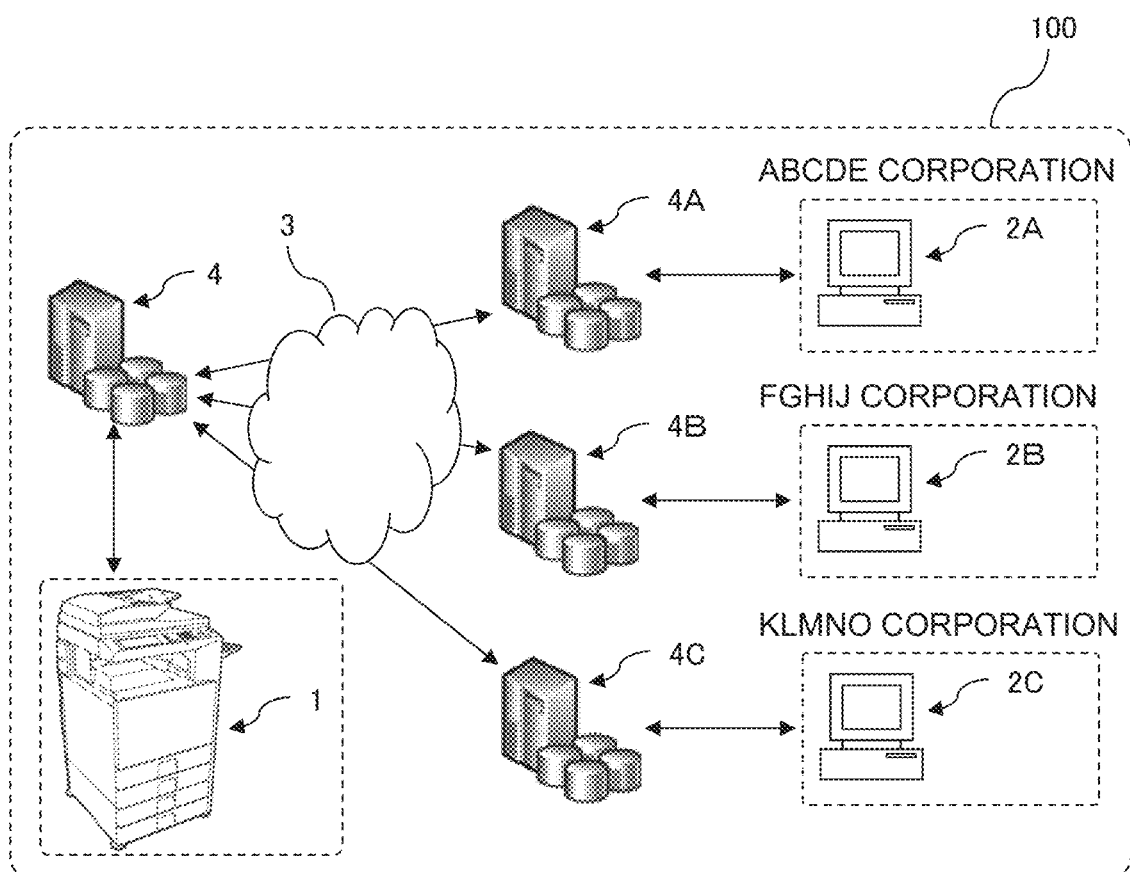
FIG. 1 is an explanatory diagram illustrating a configuration example of a network system including a digital multifunction machine according to the present invention.

FIG. 1 is an explanatory diagram illustrating a configuration example of a network system 100 including the digital multifunction machine 1 according to the present invention. Also, FIG. 2 is a block diagram illustrating a schematic configuration of the digital multifunction machine 1 in FIG. 1. Also, FIG. 3 is a block diagram illustrating a schematic configuration of a PC2 in FIG. 1.

As illustrated in FIG. 1, in the network system 100 according to the present invention, the digital multifunction machine 1 is configured to be able to transmit and receive e-mails to and from a personal computer PC2A belonging to a business partner ABCDE Corporation, a PC2B belonging to FGHIJ Corporation, and a PC2C belonging to KLMNO Corporation via mail servers 4, 4A, 4B, 4C connected through a network 3.

In the following description, the PC2A, PC2B and PC2C are generically referred to as the PC2.

The digital multifunction machine 1 is a device such as a multifunction peripheral (MFP) that digitally processes image data, and has a copy function, a printer function, a scanner function, a facsimile function, and a mail transmission function.

The digital multifunction machine 1 transmits, to the mail server 4, an e-mail with image data, and the mail server 4 transmits the e-mail to the desired PC 2A, 2B, 2C via the mail server 4A, 4B, 4C connected through the network 3.

Figure 2:
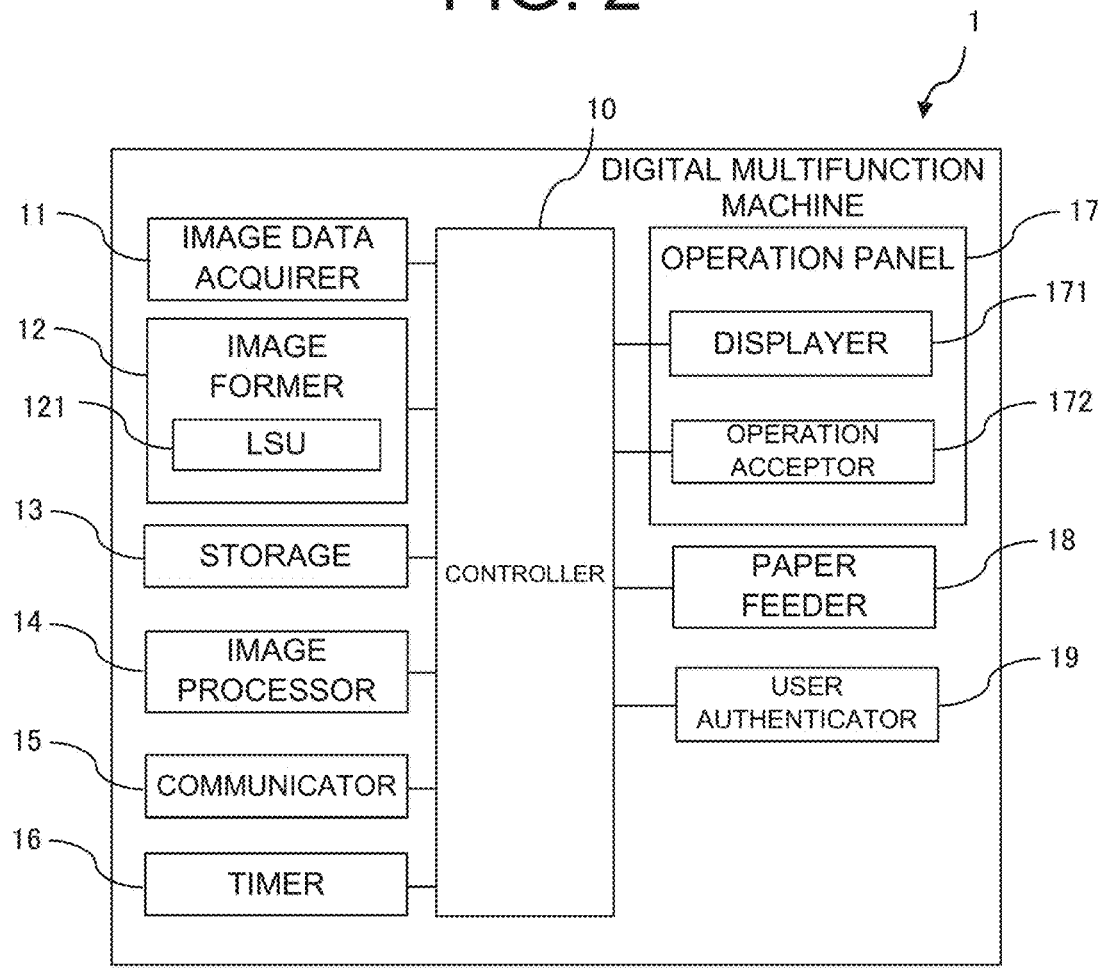
FIG. 2 is a block diagram illustrating a schematic configuration of the digital multifunction machine in FIG. 1.

As illustrated in FIG. 2, the digital multifunction machine 1 includes a controller 10, an image data acquirer 11, an image former 12, a storage 13, an image processor 14, a communicator 15, a timer 16, an operation panel 17, a paper feeder 18, and a user authenticator 19.

In the following, each component of the digital multifunction machine 1 is described.

The controller 10 integrally controls the digital multifunction machine 1, and is constituted of a CPU, a RAM, a ROM, various interface circuits, and the like.

The controller 10 performs detection of each sensor, and monitoring/controlling of all loads such as a motor, a clutch, and the operation panel 17 in order to control an overall operation of the digital multifunction machine 1.

The image data acquirer 11 is a portion that detects and reads a document placed on a document table or a document conveyed from a document tray, and generates image data. The image data acquirer 11 may also acquire image data from an external information processing device or the like via the wired/wireless network 3, or may acquire image data recorded on a USB or the like, or may be a combination of these.

The image former 12 is a portion that prints and outputs, on paper, image data acquired by the image data acquirer 11, and processed by the image processor 14; and includes an LSU 121.

The LSU 121 is a device that forms an electrostatic latent image by irradiating a laser beam associated with information on image data constituted of digital signals onto a surface of an unillustrated photoreceptor drum in a charged state.

The storage 13 is an element or a storage medium that stores information necessary for achieving various functions of the digital multifunction machine 1, a control program, and the like. For example, a semiconductor element such as a RAM and a ROM; or a storage medium such as a hard disk, a flash memory, and an SSD is used.

The storage 13 stores information related to a job such as printing, and data necessary for executing a job such as image data. The storage 13 also stores information such as a login name and a password of a user stored for user authentication.

Note that, a program and data may be held in different devices in such a way that a data holding area is constituted of a hard disk drive, and a program holding area is constituted of a flash memory.

The image processor 14 is a portion that converts image data input from the image data acquirer 11 into an appropriate electrical signal, based on a command for a job such as printing input from an operation acceptor 172, and performs processing in such a way as to be suitable for output such as enlargement and reduction.

The communicator 15 is a portion that performs communication with an external device such as the PC2, a mobile information terminal, and an information processing device via the network 3, and transmits image data and the like to these external devices via a mail or the like.

The timer 16 is a portion that measures and counts time, and acquires a time, for example, through a built-in clock or the network 3.

The operation panel 17 is constituted of a display panel composed of a liquid crystal panel or the like, and a touch panel such as a capacitive touch panel that is placed over the display panel, and detects a position touched by a finger. The operation panel 17 includes a displayer 171 and the operation acceptor 172.

The displayer 171 is a portion that displays various pieces of information. The displayer 171 is constituted of, for example, a CRT display, a liquid crystal display, an EL display, or the like, and is a display device such as a monitor or a line display for displaying electronic data such that an operating system or an application software is in processing.

The controller 10 displays, through the displayer 171, an operation and a status of the digital multifunction machine 1.

The operation acceptor 172 is an interface for operating the digital multifunction machine 1, and is a portion that accepts a command from a user.

The paper feeder 18 is a portion that conveys paper stored in a paper cassette or a manual feed tray to the image former 12.

The user authenticator 19 is a portion that authenticates whether the user is an authorized user by comparing information such as a login name and a password input from the operation acceptor 172 with correspondence information recorded in advance in the storage 13.

Note that, the user authenticator 19 may authenticate whether the user is an authorized user, based on information such as a user ID read from a user's IC card through an unillustrated card interface part.

Schematic Configuration of PC2

Next, a schematic configuration of the PC2 is described with reference to FIG. 3.

Figure 3:
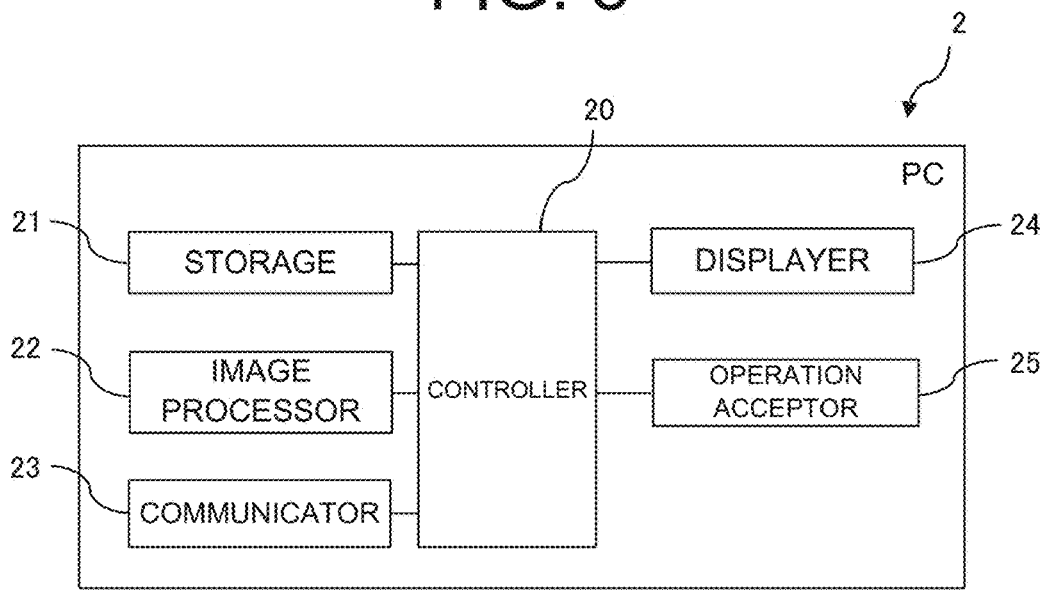
FIG. 3 is a block diagram illustrating a schematic configuration of a PC in FIG. 1.

As illustrated in FIG. 3, the PC2 includes a controller 20, a storage 21, an image processor 22, a communicator 23, a displayer 24, and an operation acceptor 25.

Since the controller 20, the storage 21, the image processor 22, the communicator 23, the displayer 24, and the operation acceptor 25 each have the same configuration as that of the controller 10, the storage 13, the image processor 14, the communicator 15, the displayer 171, and the operation acceptor 172 in FIG. 2, description thereof is omitted.

Destination Registration Processing for Address Book of Digital Multifunction Machine 1 according to Embodiment 1 of Present Invention Next, destination registration processing for an address book of the digital multifunction machine 1 according to Embodiment 1 of the present invention is described with reference to FIGS. 4 to 10.

FIG. 4 is a flowchart illustrating an example of destination registration processing for an address book of the digital multifunction machine 1 in FIG. 1.

In FIG. 4, a situation in which a user starts registering a destination in an address book is assumed. In step S1 in FIG. 4, the controller 10 checks a domain portion of an e-mail address input to destination information (step S1).

Next, in step S2, the controller 10 determines, from the domain portion, whether a destination of the e-mail address is an external address (step S2).

When the destination is not an external address (when the determination of step S2 is No), specifically, when the destination is an internal address, the controller 10 ends the processing.

On the other hand, when the destination is an external address (when the determination of step S2 is Yes), in step S3, the controller 10 inputs 0 to the counter value CN (Step S3), and in step S4 that follows, a list is made to be an empty list (step S4).

Next, the controller 10 repeats processing of step S5 for each piece of registered contract information (step S5). Herein, the processing of step S5 includes processing of steps S6 to S12.

In step S6, it is determined whether the input is an input by a target user of a predetermined contract (step S6).

When the user is not a target user (when the determination of step S6 is No), the controller 10 returns to step S5, and continues repetitive processing (step S5).

On the other hand, when the user is a target user in step S6 (when the determination of step S6 is Yes), the controller 10 repeats processing of step S7 for each contracted party (step S7). Herein, the processing of step S7 includes processing of steps S8 to S10.

The controller 10 repeats processing of step S8 for each e-mail address of a contracted party (step S8). Herein, the processing of step S8 includes processing of steps S9 to S10.

In step S9, the controller 10 collates the domain portion of the input e-mail address with a domain of a registered security policy (step S9).

Next, in step S10, the controller 10 determines whether the domain portion of the input e-mail address matches the domain of the registered security policy (step S10).

When the domain portion of the input e-mail address matches the domain of the registered security policy (when the determination of step S10 is Yes), in step S11, the controller 10 adds, to the list, a contract name and information on the contracted party (step S11).

Next, in step S12, the controller 10 adds 1 to the counter value CN (step S12), returns to step S5, and continues repetitive processing (step S5).

On the other hand, in step S10, when the domain portion of the input e-mail address does not match the domain of the registered security policy (when the determination of step S10 is No), the controller 10 repeats collation determination (step S10) with respect to a domain portion of an input e-mail address for each contracted party (step S7) and for each domain of an e-mail address (step S8).

As a result of repetition, when all the determination results of step S10 are No, the controller 10 returns to step S5, and continues repetitive processing for each piece of registered contract information.

When repetitive processing for all pieces of registered contract information is completed in step S5, the controller 10 proceeds to step S13, and determines the value of the counter value CN (step S13).

In step S13, when the value of the counter value CN is 0, since it means that the user in operation is not covered concerning all pieces of registered contract information, or that the input e-mail address is not in conformity with any of the security policies set for each piece of contract information. Therefore, in step S14, the controller 10 determines that registration of the email address is unavailable (step S14).

Alternatively, the destination may be registered by transmitting a notification requesting for approval to an administrative user having an administrative authority by an e-mail, and setting an individual security policy for approval.

On the other hand, in step S13, when the value of the counter value CN is 2 or more, in step S15, the controller 10 acquires information from the list (step S15).

When the value of the counter value CN is 2 or more, it means that the domain portion of the e-mail address matches in two or more pieces of registered contract information.

In this case, in step S16, the controller 10 causes the displayer 171 to display a contract name selection screen, and causes the operation acceptor 172 to accept in such a way that a plurality of inputs from the user are selectable (step S16).

Thereafter, the controller 10 performs processing of step S18 to be described later.

Next, in step S13, when the value of the counter value CN is 1, in step S17, the controller 10 acquires information from the list (step S17).

In step S18 that follows, the controller 10 acquires security policy information associated with the contract, and displays the security policy information on the displayer 171 to prompt the user for confirmation (step S18).

Herein, security policy settings that an administrator makes in advance are described with reference to FIGS. 5 to 10.

FIG. 5 is an example of a security policy setting screen displayed on the displayer 171 of the digital multifunction machine 1 in FIG. 1. Security policy settings are made in advance by an administrative user having an administrative authority.

In the example of FIG. 5, a contract name "Confidentiality Agreement on X1", an expiration date "2021/03/06", a target user, a contracted party name 1 "ABCDE Corporation", a domain "*@abcde.co.jp; *@123-abcde.co.jp", and job settings are made.

In FIG. 5, it appears that only a single contracted party can be set, but a plurality of contracted parties and domains may also be set.

FIG. 6 is an example of a domain-based security policy setting screen displayed on the displayer 171 of the digital multifunction machine 1 in FIG. 1.

As illustrated in FIG. 6, an administrative user having an administrative authority may make security policy settings for each domain.

In the example of FIG. 6, a domain "*@abcde.co.jp; *@123-abcde.co.jp", an organization name "ABCDE Corporation", a contract name 1 "Confidentiality Agreement on X1", an expiration date "2021/03/06", a target user, and job settings are made.

In FIG. 6, it appears that only a single piece of contract information can be set, but a plurality of pieces of contract information, and target users and job settings associated with the contract information may also be set.

FIG. 7 is an example of a job setting screen displayed on the displayer 171 of the digital multifunction machine 1 in FIG. 1.

FIG. 7 illustrates an example of job settings made for each domain of a contracted party on the security policy setting screen illustrated in FIG. 5.

As illustrated in the example in FIG. 7, as job settings to be made in a security policy for each contract, settings such that "confirmation message when transmitting" is "valid", "protection of PDF file" is "valid", "default password", and "prohibition of printing" is "invalid" are made.

FIG. 8 is an example of job setting items in the digital multifunction machine 1 in FIG. 1. As illustrated in FIG. 8, as an example of job settings, there are settings such as "valid/invalid" for "confirmation message when transmitting", "valid/invalid" for "protection of PDF file", "default password", "valid/invalid" for "prohibition of printing", "valid/invalid" for "document invalidation after expiry of contract", "valid/invalid" for "addition of watermark", "detail settings (such as wording, color, and density)", and "valid/invalid" for "recording of transmissionhistory".

Figure 9:
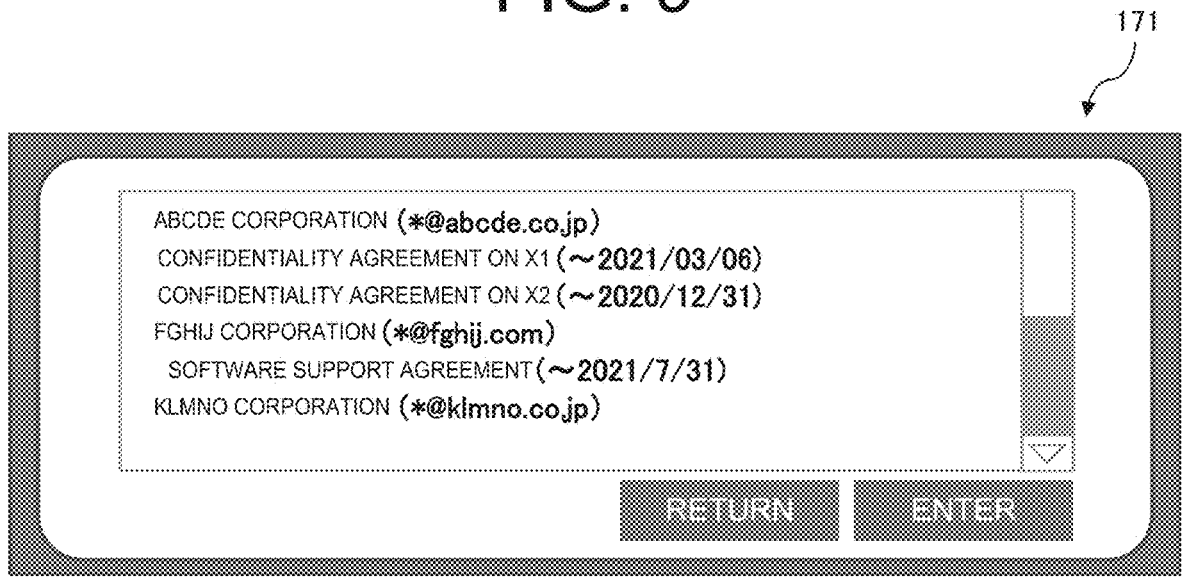
FIG. 9 is an example of contract case registration settings of the digital multifunction machine in FIG. 1.

FIG. 9 is an example of contract case registration settings of the digital multifunction machine 1 in FIG. 1. The contract case registration settings are made in advance by an administrative user having an administrative authority.

In the example of FIG. 9, it is set that Confidentiality Agreement on X1 (valid until 2021/03/06) and Confidentiality Agreement on X2 (valid until 2020/12/31) have been concluded with ABCDE Corporation (domain name: abcde.co.jp). It is also set that a software support agreement (valid until 2021/07/31) has been concluded with FGHIJ Corporation (domain name: fghij.com). An agreement with KLMNO Corporation (domain name: klmno.co.jp) is also set in a similar manner.

Figure 10:
FIG. 10 is an example of contract case registration settings for each user of the digital multifunction machine in FIG. 1.

FIG. 10 is an example of contract case registration settings for each user of the digital multifunction machine 1 in FIG. 1. The contract case registration settings for each user are made in advance by an administrative user having an administrative authority.

Normally, a contract case in which each user is involved is set by selecting the contract case from a user list at a time of registering the security policy. A contract case may also be selected and set from a list of registered contract cases when a new user is additionally registered or settings of an existing user are changed.

In the example of FIG. 10, it is set that XXYYZZ Company (domain name: XXYYZZ.co.jp) has concluded Confidentiality Agreement on X1 (valid until 2021/03/06) and Confidentiality Agreement on X2 (valid until 2020/12/31) with ABCDE Corporation (domain name: abcde.co.jp). An agreement with FGHIJ Corporation (domain name: fghij.com) and KLMNO Corporation (domain name: klmno.co.jp) is also set in a similar manner.

Herein, in a case where a user of XXYYZZ Company is involved in Confidentiality Agreement on X1 with ABCDE Corporation, as illustrated in FIG. 10, the administrative user puts a check in the in-house (domain name: XXYYZZ.co.jp) and Confidentiality Agreement on X1 with ABCDE Corporation (domain name: abcde.co.jp).

Next, in step S19 in FIG. 4, the controller 10 registers the e-mail address (destination information) and the contract information in association with each other (step S19).

Next, destination setting processing at a time of job execution of the digital multifunction machine 1 according to Embodiment 1 of the present invention is described with reference to FIGS. 11 and 12.

Figure 11:
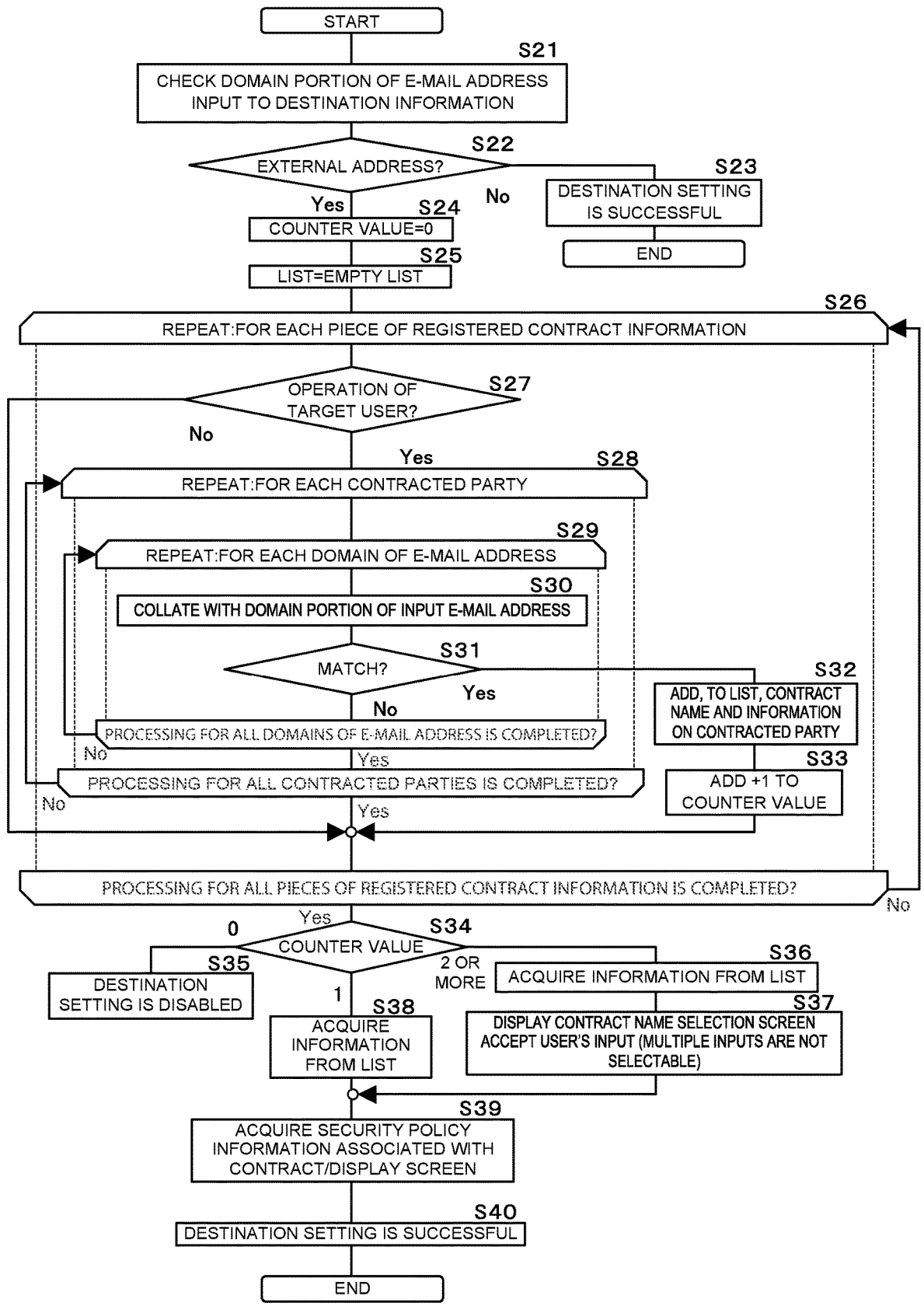
FIG. 11 is a flowchart illustrating an example of destination setting processing at a time of job execution of the digital multifunction machine in FIG. 1.

FIG. 11 is a flowchart illustrating an example of destination setting processing at a time of job execution of the digital multifunction machine 1 in FIG. 1. Since processing of steps S21, S22, S24 to S34, S36, S38 and S39 in FIG. 11 respectively corresponds to processing of steps S1 to S13, S15, S16 and S18 in FIG. 4, description thereof is omitted. Herein, processing of steps S23, S35, S37 and S40 in FIG. 11, which are different from those in FIG. 4, is described.

In FIG. 11, a case is assumed in which the user directly inputs a destination when executing a job such as e-mail transmission.

In step S21 in FIG. 11, the controller 10 checks a domain portion of an e-mail address input to destination information (step S21).

Next, in step S22, the controller 10 determines whether a destination of the e-mail address is an external address from the domain portion (step S22).

When the destination is not an external address (when the determination of step S22 is No), in step S23, the controller 10 accepts the user's input (step S23) assuming that destination setting is successful, and ends the processing.

Next, as a result of repetitive processing of step S26, when the value of the counter value CN is 0 in the determination of step S34, in step S35, the controller 10 does not accept the user's input by disabling the destination setting (step S35).

Note that, when approval by the administrative user is completed according to a predetermined approval procedure, a general user who does not have a predetermined authority may also be able to set a destination.

On the other hand, in step S34 in FIG. 11, when the value of the counter value CN is 2 or more, in step S36, the controller 10 acquires information from the list (step S36).

Next, in step S37, the controller 10 causes the displayer 171 to display a contract name selection screen, and causes the operation acceptor 172 to accept an input from the user (step S37). However, in this case, multiple inputs are not selectable.

Next, in step S39, the controller 10 acquires security policy information associated with the contract, and displays the security policy information on the displayer 171 to prompt the user for confirmation (step S39), and thereafter, in step S40 that follows, the controller 10 accepts the user's input assuming that destination setting is successful (step S40).

Figure 12:
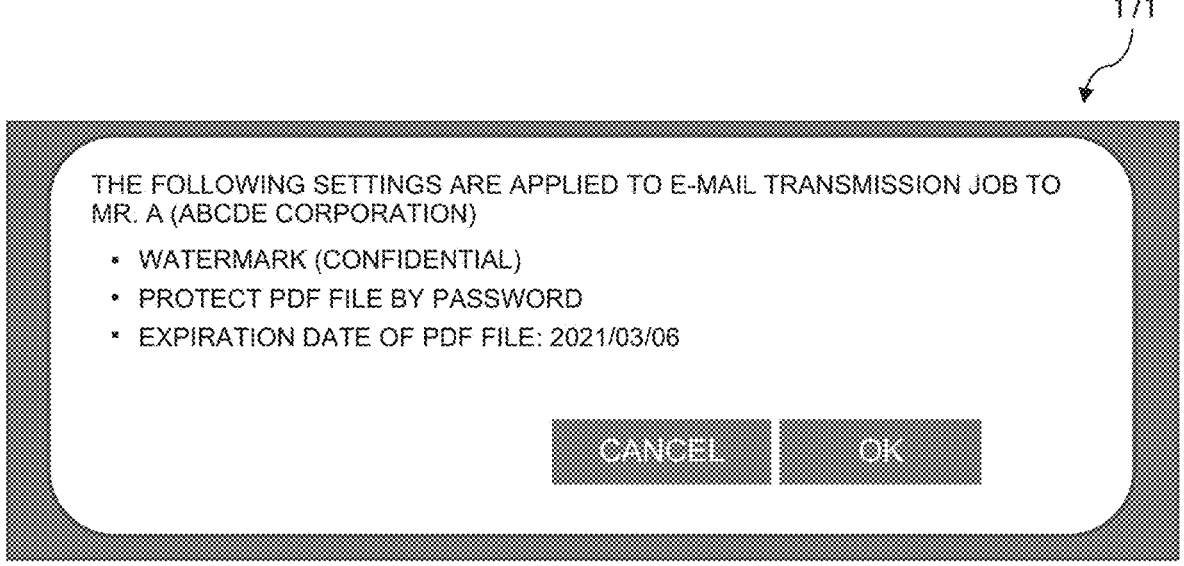
FIG. 12 is an explanatory diagram illustrating an example of a confirmation message displayed on the displayer of the digital multifunction machine in FIG. 1.

FIG. 12 is an explanatory diagram illustrating an example of a confirmation message displayed on the displayer 171 of the digital multifunction machine 1 in FIG. 1.

In the example of FIG. 12, a case is assumed in which a destination of the employee A of ABCDE Corporation is input. At this occasion, a message "The following settings are applied to an e-mail transmission job to Mr. A (ABCDE Corporation)." is displayed on the displayer 171.

Then, underneath the message, predetermined job settings such as "watermark (CONFIDENTIAL)", "PDF file is protected by password", and "expiration date of PDF file: 2020/03/06" are displayed.

In this way, since it is determined whether a domain matches a target domain applicable to the contract for each predetermined contract, and settings of the e-mail address are accepted, only when the domains match, erroneous transmission can be prevented. Further, since settings in conformity with a security policy registered for each contract are automatically applied, it is possible to achieve the digital multifunction machine 1 capable of performing image transmission more appropriately than before to a party with whom a contract has been concluded, without making settings for individual destinations in an e-mail.

Embodiment 2

Next, destination setting processing at a time of job execution of a digital multifunction machine 1 according to Embodiment 2 of the present invention is described with reference to FIGS. 13 and 14.

Since a schematic configuration of the digital multifunction machine 1 according to Embodiment 2 is identical to that of Embodiment 1 (FIG. 2), description thereof is omitted.

Figure 13:
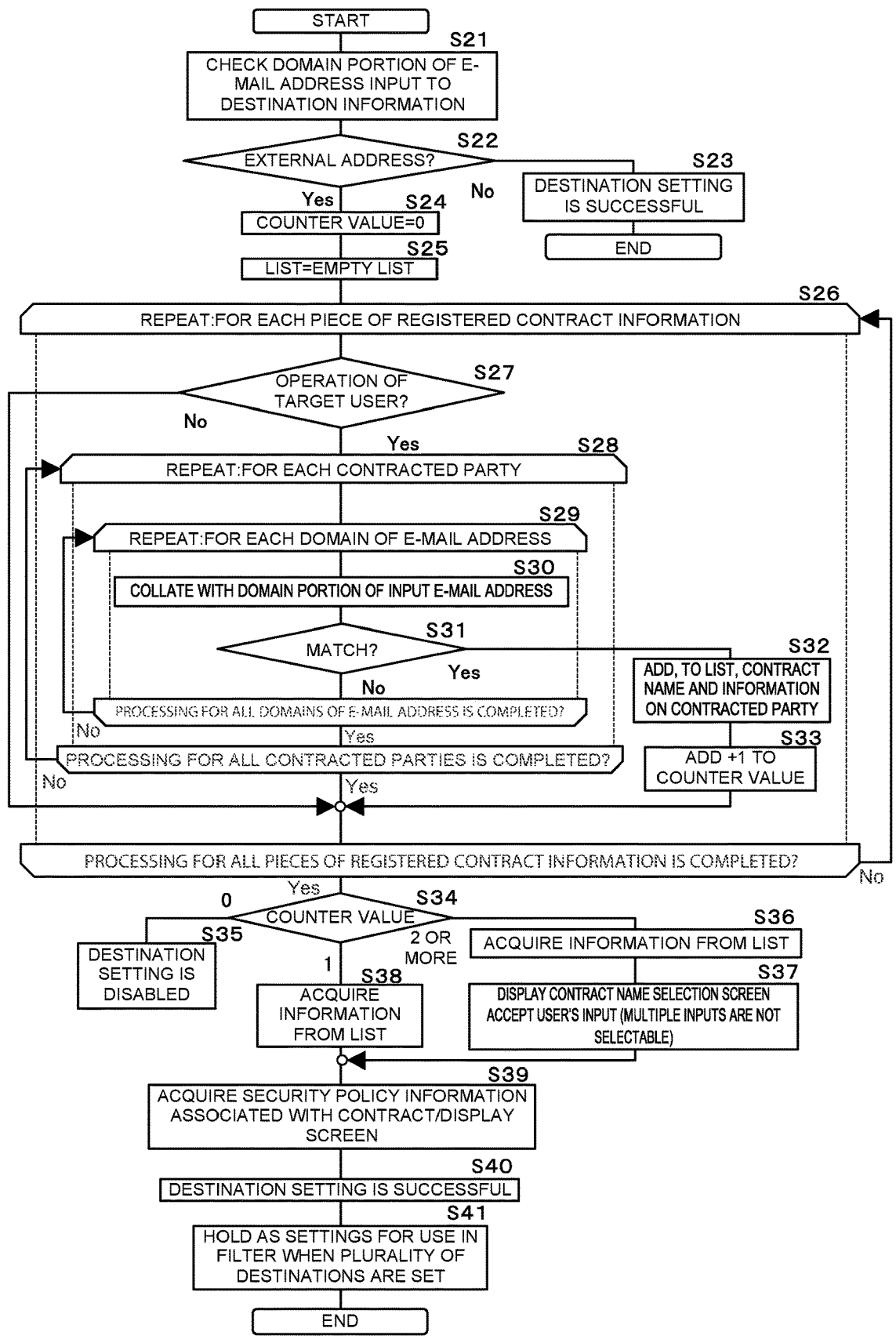
FIG. 13 is a flowchart illustrating an example of destination setting processing at a time of job execution of a digital multifunction machine according to Embodiment 2 of the present invention in a case where a destination of an external address is not included in an already set destination.

FIG. 13 is a flowchart illustrating an example of destination setting processing at a time of job execution of the digital multifunction machine 1 according to Embodiment 2 of the present invention in a case where a destination of an external address is not included in an already set destination.

Since processing of steps S21 to S40 in FIG. 13 respectively corresponds to processing of steps S21 to S40 in FIG. 11, description thereof is omitted. Herein, processing of step S41 in FIG. 13, which is different from that in FIG. 11, is described.

In step S40 of FIG. 13, after accepting the user's input assuming that destination setting is successful (step S40), in step S41 that follows, a controller 10 associates contract information acquired in processing from step S26 to step S38 with a job, and stores the contract information in a storage 13, as settings for use in a filter, when a plurality of destinations are set at a later stage (step S41).

Figure 14:
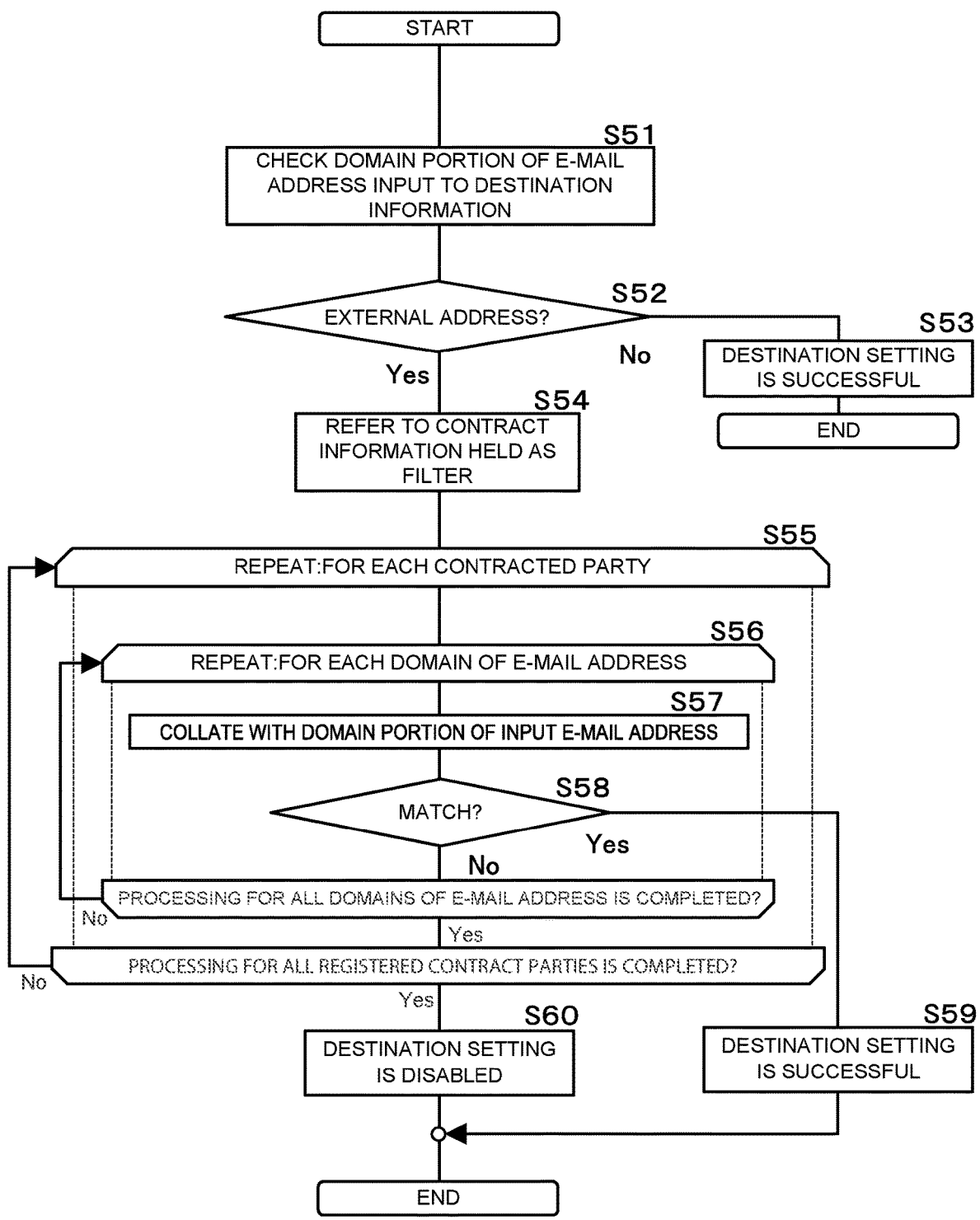
FIG. 14 is a flowchart illustrating an example of destination setting processing at a time of job execution of the digital multifunction machine according to Embodiment 2 of the present invention in a case where a destination of an external address is included in an already set destination.

FIG. 14 is a flowchart illustrating an example of destination setting processing at a time of job execution of the digital multifunction machine 1 according to Embodiment 2 of the present invention in a case where a destination of an external address is included in an already set destination.

In this case, at a start time, contract information associated with a job at a time of setting an external address is stored in the storage 13, as settings for use in a filter of a destination (step S41 in FIG. 13).

Since processing of steps S51 to S53 and S55 to S58 in FIG. 14 respectively corresponds to processing of steps S21 to S23 and S28 to S31 in FIG. 13, description thereof is omitted. Herein, processing of steps S54, S59, and S60 in FIG. 14, which are different from those in FIG. 13, is described.

In step S52 in FIG. 14, when the destination of the e-mail address input to the destination information is an external address (when the determination of step S52 is Yes), in step S54, the controller 10 refers to the contract information stored in the storage 13 as a filter (step S54).

Next, the controller 10 repeats the processing of step S55 for each contracted party (step S55).

Then, in step S58, the controller 10 determines whether the domain portion of the input e-mail address matches a registered domain (step S58).

When the domains match (when the determination of step S58 is Yes), in step S59, the controller 10 accepts the user's input assuming that destination setting is successful (step S59).

On the other hand, when there is no single domain that matches any of the contracted parties (when the determination of step S58 is No), it is assumed that the input e-mail address is not related to the contract associated with the job, or is an incorrect address, and in step S60, the controller 10 determines that destination addition setting in the e-mail address is disabled (Step S60).

In this way, in the digital multifunction machine 1 capable of performing image transmission more appropriately than before to a party with whom a contract has been concluded, without making settings for individual destinations, when destination setting for an external address is successful, contract information is held as a filter, and referred to when a destination is set at a later stage. Therefore, it is possible to achieve the efficient digital multifunction machine 1.

Embodiment 3

Next, destination setting processing at a time of job execution of a digital multifunction machine 1 according to Embodiment 3 of the present invention is described with reference to FIGS. 15 and 16.

Since a schematic configuration of the digital multifunction machine 1 according to Embodiment 3 is identical to that of Embodiment 1 (FIG. 2), description thereof is omitted.

Figure 15:
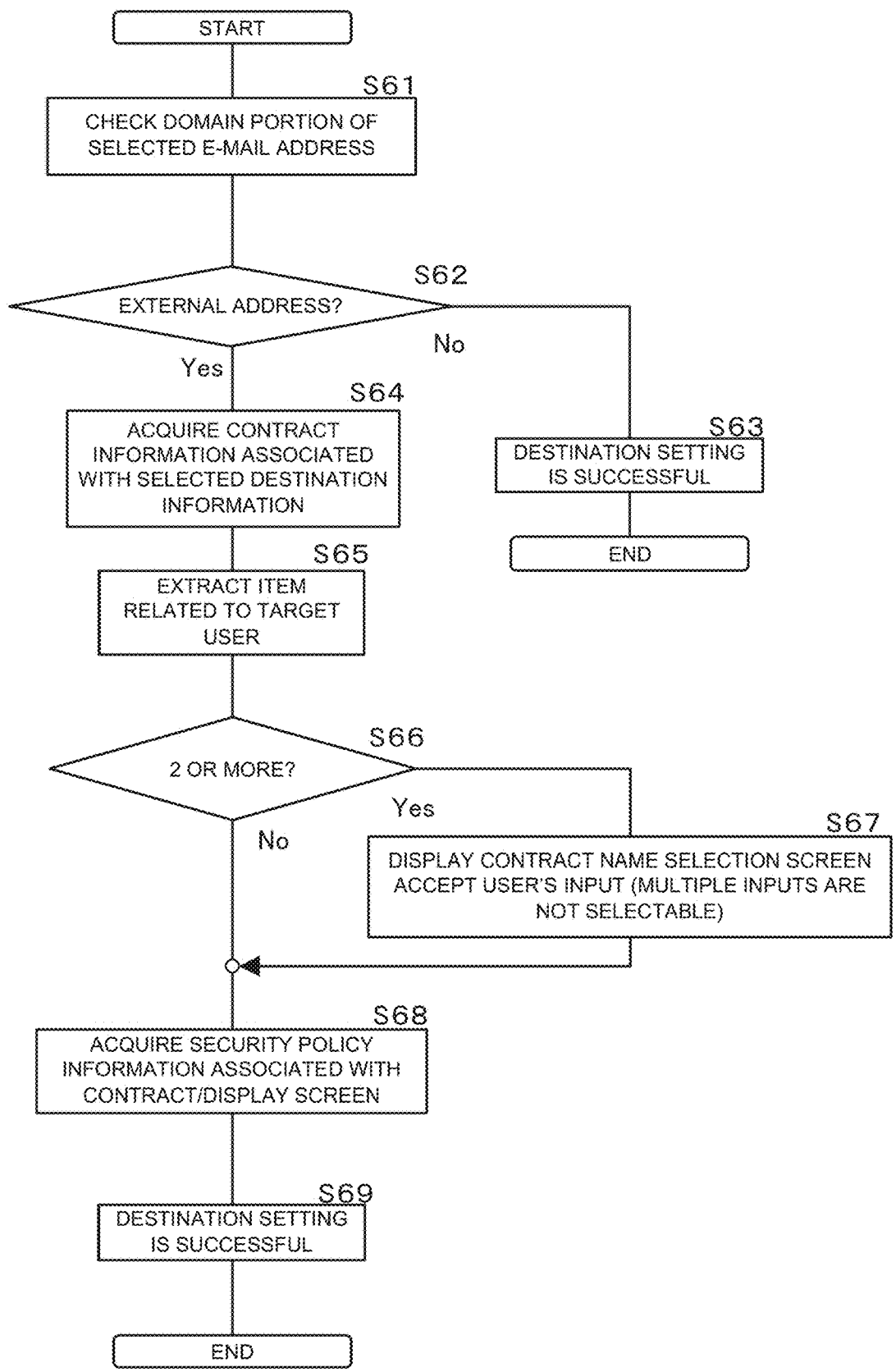
FIG. 15 is a flowchart illustrating an example of destination setting processing at a time of job execution of a digital multifunction machine according to Embodiment 3 of the present invention.

FIG. 15 is a flowchart illustrating an example of destination setting processing at a time of job execution of the digital multifunction machine 1 according to Embodiment 3 of the present invention.

In Embodiment 3, a case is assumed in which a user selects a destination at a time of execution of a job such as e-mail transmission from a registered destination.

In step S61 in FIG. 15, a controller 10 checks a domain portion of a selected e-mail address (step S61).

Next, in step S62, the controller 10 determines whether a destination of the e-mail address is an external address from the domain portion (step S62).

When the destination of the e-mail address is not an external address (when the determination of step S62 is No), in step S63, the controller 10 accepts the user's selection assuming that destination setting is successful (step S63), and ends the processing.

On the other hand, when the destination of the e-mail address is an external address (when the determination of step S62 is Yes), in step S64, the controller 10 acquires contract information associated with the selected destination information (step S64).

Then, in step S65, the controller 10 extracts, from among the contract information, a piece of information related to the target user (step S65).

Next, in step S66, the controller 10 determines whether there are two or more pieces of information related to the target user among the contract information (step S66).

When there are two or more pieces of information (when the determination of step S66 is Yes), in step S67, the controller 10 causes a displayer 171 to display a contract name selection screen, and causes an operation acceptor 172 to accept an input from the user (step S67). However, in this case, multiple inputs are not selectable.

Thereafter, the controller 10 performs processing of step S68 to be described later.

On the other hand, in the determination of step S66, when the number of pieces of information related to the target user is only one among the contract information (when the determination of step S66 is No), in step S68, the controller 10 acquires security policy information associated with the contract, and displays the security policy information on the displayer 171 to prompt the user for confirmation (step S68), and thereafter, in step S69 that follows, the controller 10 accepts the user's selection assuming that destination setting is successful (step S69).

Figure 16:
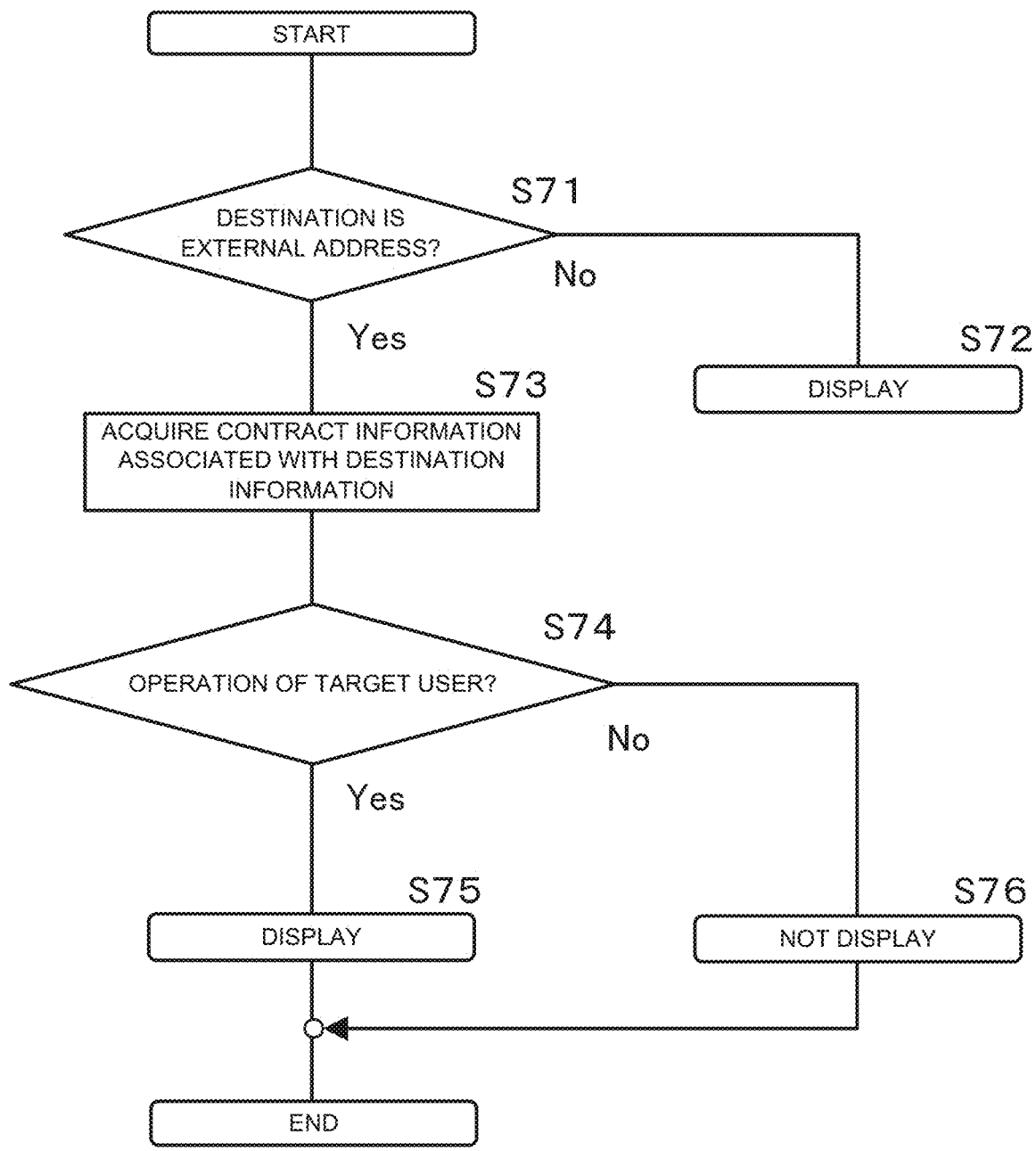
FIG. 16 is a flowchart illustrating an example of display/non-display determination processing of each destination on a destination selection screen of the digital multifunction machine according to Embodiment 3 of the present invention.

FIG. 16 is a flowchart illustrating an example of display/non-display determination processing of each destination on a destination selection screen of the digital multifunction machine 1 according to Embodiment 3 of the present invention.

In step S71 of FIG. 16, it is determined whether the destination of the e-mail address is an external address (step S71).

When the destination of the e-mail address is not an external address (when the determination of step S71 is No), specifically, when the destination is an internal address, in step S72, the controller 10 causes the displayer 171 to display the destination (step S72).

On the other hand, when the destination of the e-mail address is an external address (when the determination of step S71 is Yes), in step S73, the controller 10 acquires contract information associated with the destination information (step S73).

Next, in step S74, the controller 10 determines whether the operation is an operation of the target user (step S74). When the operation is an operation of the target user (when the determination of step S74 is Yes), in step S75, the controller 10 displays the destination on the displayer 171 (step S75). On the other hand, when the operation is not an operation of the target user (when the determination of step S74 is No), in step S76, the controller 10 does not display the destination on the displayer 171 (step S76).

Thus, on a destination selection screen, contract information associated with destination information is acquired regarding a registered external address, and the external address is displayed on the displayer 171, only when the operation is an operation of a target user.

In this way, even when the user selects a destination from among registered destinations at a time of execution of a job such as e-mail transmission, it is possible to achieve the digital multifunction machine 1 capable of performing image transmission more appropriately than before to a party with whom a confidentiality agreement has been concluded, without making settings for individual destinations.

Embodiment 4

Next, destination setting processing at a time of job execution of a digital multifunction machine 1 according to Embodiment 4 of the present invention is described with reference to FIGS. 17 to 19.

Since a schematic configuration of the digital multifunction machine 1 according to Embodiment 4 is identical to that of Embodiment 1 (FIG. 2), description thereof is omitted.

Figure 17:
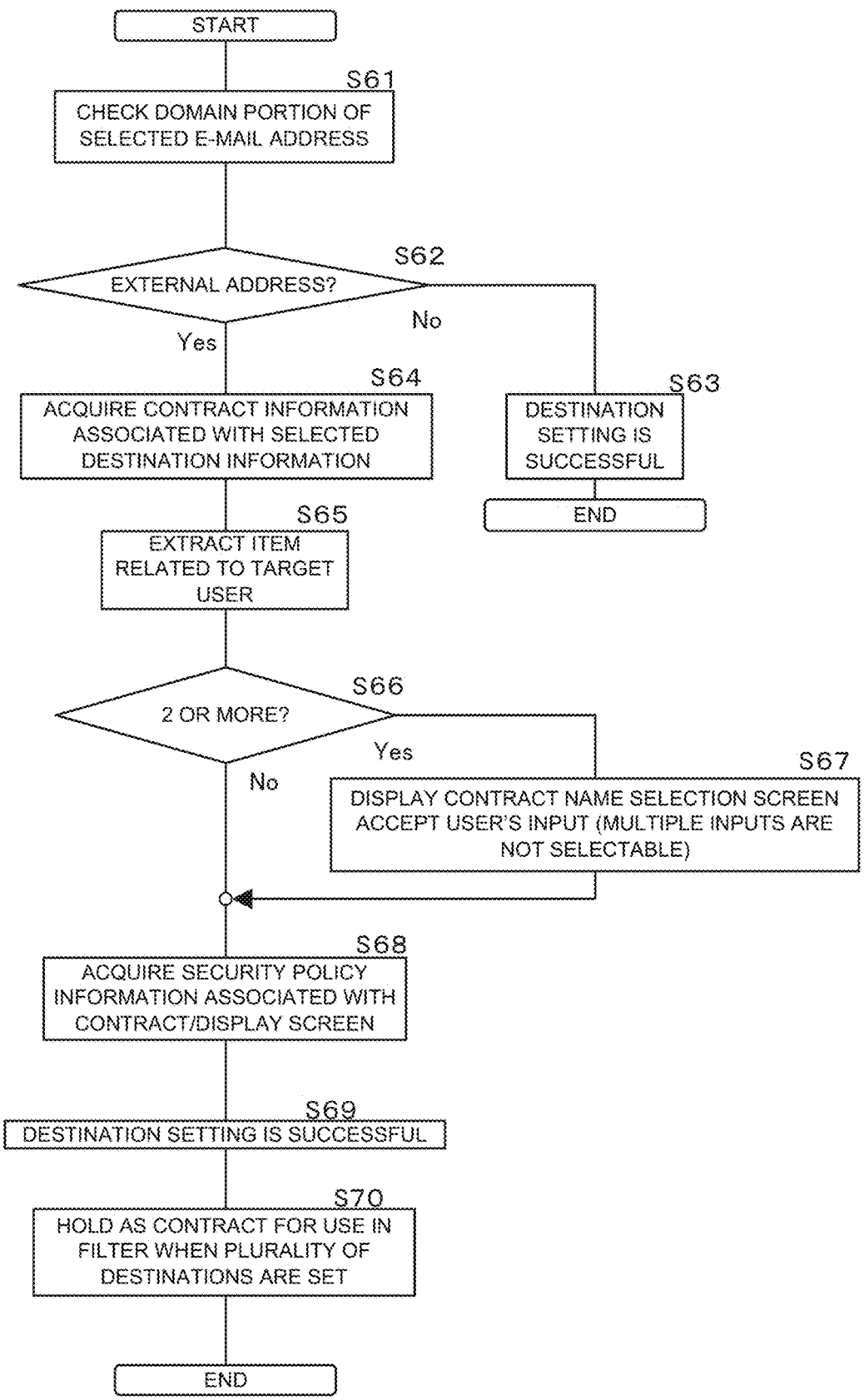
FIG. 17 is a flowchart illustrating an example of destination setting processing at a time of job execution of a digital multifunction machine according to Embodiment 4 of the present invention in a case where a destination of an external address is not included in an already set destination.

FIG. 17 is a flowchart illustrating an example of destination setting processing at a time of job execution of the digital multifunction machine 1 according to Embodiment 4 of the present invention in a case where a destination of an external address is not included in an already set destination.

Since processing of steps S61 to S69 in FIG. 17 respectively corresponds to processing of steps S61 to S69 in FIG. 15, description thereof is omitted. Herein, processing of step S70 of FIG. 17, which is different from that in FIG. 15, is described.

In step S69 in FIG. 17, after accepting the user's input assuming that destination setting is successful (step S69), in step S70 that follows, a controller 10 associates contract information acquired in the processing from step S64 to step S67 with a job, and stores the contract information in a storage 13, as settings for use in a filter, when a plurality of destinations are set at a later stage (step S70).

Figure 18:
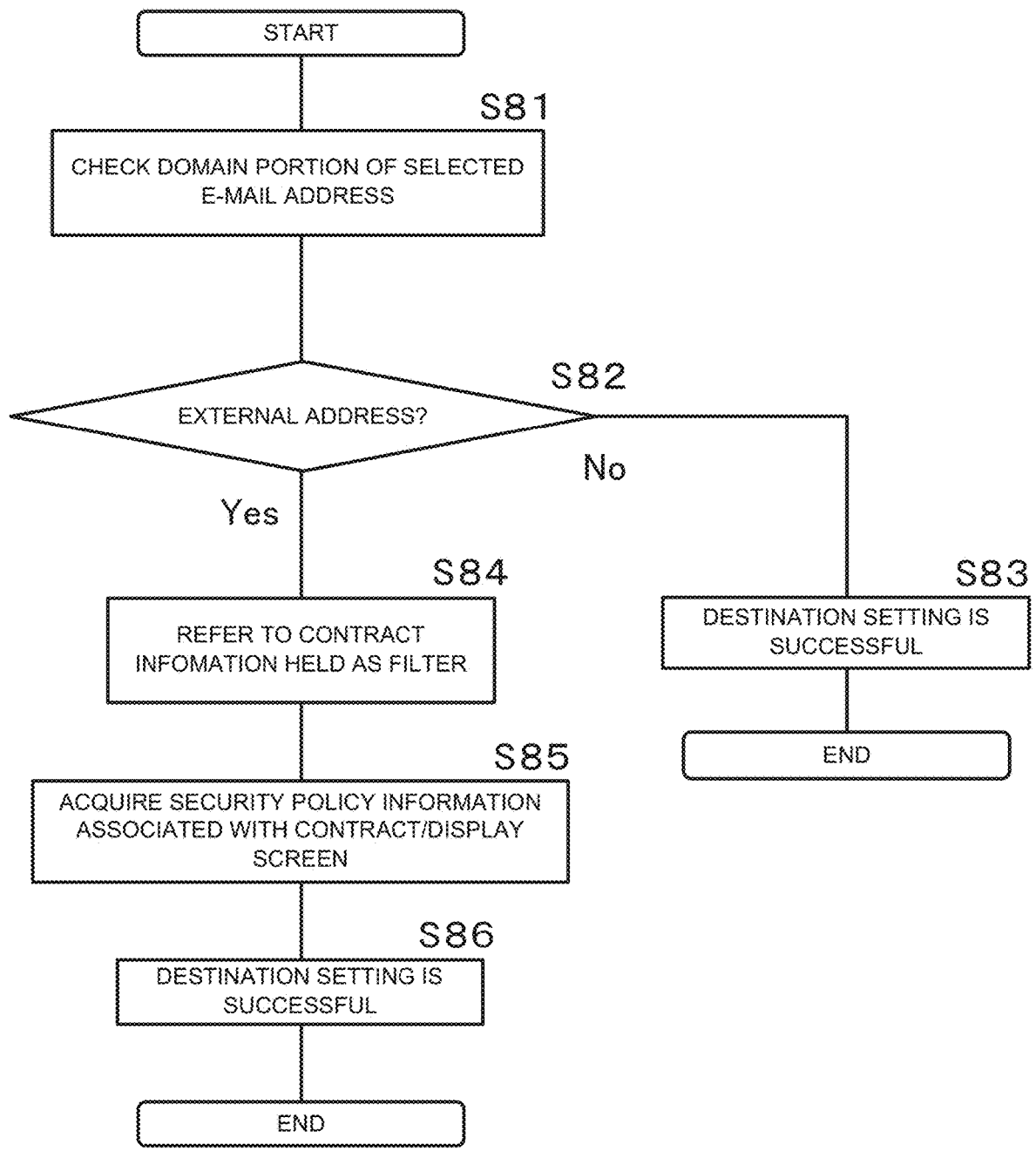
FIG. 18 is a flowchart illustrating an example of destination setting processing at a time of job execution of the digital multifunction machine according to Embodiment 4 of the present invention in a case where a destination of an external address is included in an already set destination.

FIG. 18 is a flowchart illustrating an example of destination setting processing at a time of job execution of the digital multifunction machine 1 according to Embodiment 4 of the present invention in a case where a destination of an external address is included in an already set destination.

In this case, at a start time, contract information associated with a job at a time of setting an external address is stored in the storage 13, as settings for use in a filter of a destination (step S70 in FIG. 17).

Since processing of steps S81 to S83, S85, and S86 in FIG. 18 respectively corresponds to processing of steps S61 to S63, S68, and S69 in FIG. 17, description thereof is omitted. Herein, processing of step S84 in FIG. 18, which is different from that in FIG. 17, is described.

In step S82 in FIG. 18, when the destination of the e-mail address is an external address (when the determination of step S82 is Yes), in step S84, the controller 10 refers to the contract information held as a filter (step S84).

Next, in step S85, the controller 10 acquires security policy information associated with the contract, and displays the security policy information on a displayer 171 to prompt the user for confirmation (step S85), and thereafter, in step S86 that follows, the controller 10 accepts the user's selection assuming that destination setting is successful (step S86).

FIG. 19 is a flowchart illustrating an example of display/non-display determination processing for each destination on a destination selection screen of the digital multifunction machine 1 according to Embodiment 4 of the present invention in a case where a destination of an external address is included in an already set destination.

Since display/non-display determination processing for a destination when a destination of an external address is not included in an already set destination is identical to that in Embodiment 3 (FIG. 16), description thereof is omitted.

Since processing of steps S91 to S93, S95, and S96 in FIG. 19 respectively corresponds to processing of steps S71 to S73, S75, and S76 in FIG. 16, description thereof is omitted. Herein, processing of step S94 in FIG. 19, which is different from that in FIG. 16, is described.

In step S93 in FIG. 19, after acquiring contract information associated with the destination information (step S93), in step S94 that follows, the controller 10 determines whether the contract information includes a contract associated with a job (step S94).

When the contract information includes the contract associated with the job (when the determination of step S94 is Yes), in step S95, the controller 10 displays the destination on the displayer 171 (step S95). On the other hand, when the contract information does not include the contract associated with the job (when the determination of step S94 is No), in step S96, the controller 10 does not display the destination on the displayer 171 (step S96).

Thus, in a case where a plurality of registered external addresses are set on a destination selection screen, contract information associated with a job at a time of setting an external address for the first time is acquired, and the external address is displayed on the displayer 171, only when the destination is a destination associated with the contract.

In this way, even when a user selects a destination at a time of execution of a job such as e-mail transmission from a registered destination, in the digital multifunction machine 1 capable of performing image transmission more appropriately than before to a party with whom a contract has been concluded, without making settings for individual destinations, when destination setting of an external address is successful, contract information is held as a filter and referred to when a destination is set at a later stage. Therefore, it is possible to achieve the digital multifunction machine 1 capable of efficiently setting a plurality of destinations, while preventing erroneous transmission to a destination unrelated to the contract.

Embodiment 5

Next, display of history information associated with a contract, and an operation that can be performed with respect to the display in a digital multifunction machine 1 according to Embodiment 5 of the present invention are described with reference to FIGS. 20 to 22.

The digital multifunction machine 1 according to Embodiment 5 stores information on a transmission history, and data in a storage 13 for each execution of a transmission job, based on predetermined settings. In this case, a contract name, a transmission date and time of a job, a name of a transmission file, a sender, a low-resolution version of a transmitted image (for a predetermined number of pages), a result of OCR, and the like are stored in the storage 13.

FIG. 20 is an explanatory diagram illustrating an example of a confirmation screen on a transmission history on jobs in the digital multifunction machine 1 according to Embodiment 5 of the present invention. Although the user can confirm the transmission history from an operation screen of a displayer 171, the user may also be able to confirm the transmission history from a web page for administration.

As an example of the confirmation screen on the transmission history, as illustrated in FIG. 20, a transmission history on jobs is displayed on the confirmation screen with a message: "The following is a history on transmission jobs you have performed in relation to the contract name 'Confidentiality Agreement on X1'. To narrow down the list, click an item in the heading line.".

In the example of FIG. 20, a list constituted of six items: "destination", "transmission date and time", "subject name", "name of transmission file", "mail body", and "image confirmation" is displayed.

FIG. 21 is an explanatory diagram illustrating an example of a confirmation screen on a transmission history on jobs when a contract expiration date in the digital multifunction machine 1 according to Embodiment 5 of the present invention has come.

When recording of a transmission history is set to be valid, a controller 10 causes a communicator 15 to notify the user associated with a contract, of a contract expiration date at a predetermined timing, and to transmit a list of a transmission history on jobs related to the contract.

Also, a notification mail on the contract expiration date may be transmitted to the user at a predetermined timing, and connection to a URL of a web page on which a transmission history on jobs can be referred to may be written in the notification mail.

As an example of the confirmation screen on the transmission history, as illustrated in FIG. 21, a transmission history on jobs is displayed on the confirmation screen with a message: "The expiration date of the contract name 'Confidentiality Agreement on X1' is 12/31/2020. The following is a history on transmission jobs you have performed in relation to this agreement. To narrow down the list, click an item in the heading line.".

Note that, documents related to the contract may be made unbrowsable after the contract expiration date has come.

FIG. 22 is an explanatory diagram illustrating an example of a confirmation screen on a transmission history on jobs when the contract expiration date in the digital multifunction machine 1 according to Embodiment 5 of the present invention has been extended.

When the contract expiration date has been extended, a job and an image transmitted by the user associated with the contract may be extracted from among those stored in a storage 13, and displayed as a list on a predetermined web page in such a way that the user can refer to them.

As an example of the confirmation screen on the transmission history, as illustrated in FIG. 22, a transmission history on jobs is displayed on the confirmation screen with a message: "The expiration date of the contract name 'Confidentiality Agreement on X1' has been extended until 2021/12/31. You can re-create and send a PDF and an email transmission file with the expiration date reset for the following ones among transmission jobs you have performed in relation to this agreement. Select desired ones.".

A user can easily send an image whose contract expiration date is updated, since a PDF file that reflects the new expiration date is generated from a stored image by putting a check in a necessary item for selection, and pressing the "execute" button.

In this way, in the digital multifunction machine 1 capable of performing image transmission more appropriately than before to a party with whom a contract has been concluded, without making settings for individual destinations, it is possible to achieve the digital multifunction machine 1 in which the user can easily send an image file that reflects a new expiration date, when the contract expiration date is updated.

Preferred embodiments according to the present invention also include those obtained by combining any of the embodiments described above.

In addition to the embodiments described above, various modifications of the present invention are available. These modifications should not be construed as not belonging to the scope of the present invention. The present invention should include the meaning equivalent to the scope of the claims and all modifications within the scope.

What is claimed is:

1. An image transmission device comprising:
   a communicator that transmits image data to an e-mail address set by a user via a network;
   a storage that stores, for each predetermined case in a plurality of predetermined cases, a target domain applicable to the predetermined case and a target user applicable to the predetermined case; and
   a controller having at least a CPU, the controller controlling the communicator and the storage and authenticating the user, wherein
   the target domain is transmittable for the target user,
   the target domain and the target user are registered together for the predetermined case,
   when the user sets the e-mail address to which the image data is to be transmitted, the controller determines whether a domain portion of the e-mail address matches the target domain of any of the plurality of predetermined cases, and when the domain portion matches the target domain, the controller accepts settings of the e-mail address,
   when the domain portion of the e-mail address does not match the target domain of any of the plurality of predetermined cases, the controller does not accept the settings of the e-mail address,
   when the user sets the e-mail address to which the image data is to be transmitted, the controller further determines, as a first determination, whether the user authenticated by the controller is the target user of the predetermined case, when the user is the target user, the controller determines, as a second determination following the first determination, whether the domain portion of the e-mail address matches the target domain transmittable for the target user, and when the domain portion matches the target domain, the controller accepts the settings of the e-mail address, and
   when the user is not the target user, or when the domain portion of the email address does not match the target domain transmittable for the target user, the controller does not accept the settings of the e-mail address.

2. The image transmission device according to claim 1, wherein
   the storage stores the transmission settings that are defined in advance for the target domain of the predetermined case, and
   when the domain portion of the e-mail address matches the target domain of the predetermined case, the controller makes the transmission settings for the image data based on the transmission settings defined based on the target domain.

3. The image transmission device according to claim 2, wherein
   the transmission settings include at least one of an addition of a watermark to the image data, a protection by a password, and an expiration date.

4. The image transmission device according to claim 2, further comprising a display that displays various pieces of information to the user, wherein
   when the controller makes the transmission settings for the image data based on the transmission settings defined based on the target domain, the controller causes the display to display a content of the transmission settings.

5. The image transmission device according to claim 1, further comprising a display that displays various pieces of information to the user, wherein
   the storage further stores a transmission history on the image data, and an expiration date of the predetermined case, and
   the controller further causes the display to display the expiration date of the predetermined case, and a list of the transmission history on the image data pertaining to the predetermined case at a predetermined timing.

* * * * *